April 19, 1927.  
A. E. ROBINSON  
1,625,397
FRICTION CLUTCH MECHANISM
Filed Aug. 11, 1924  2 Sheets-Sheet 2
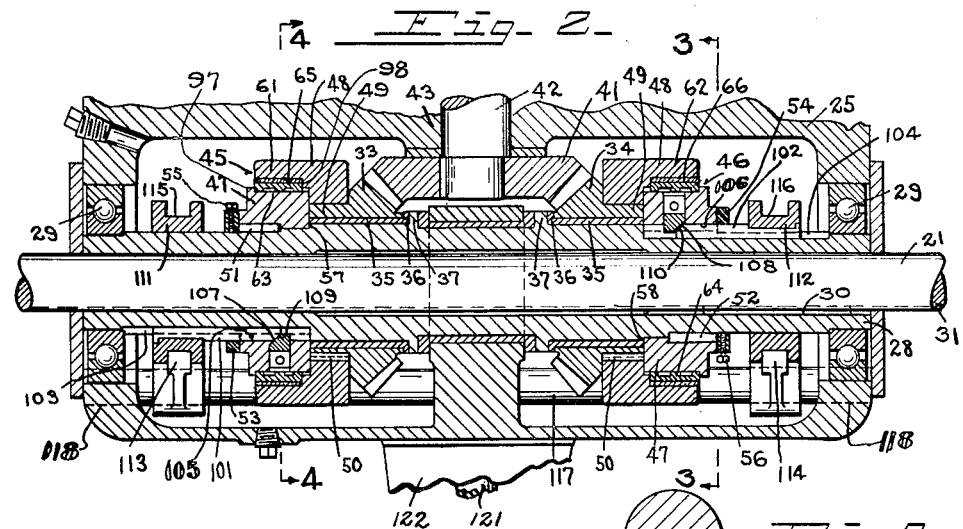
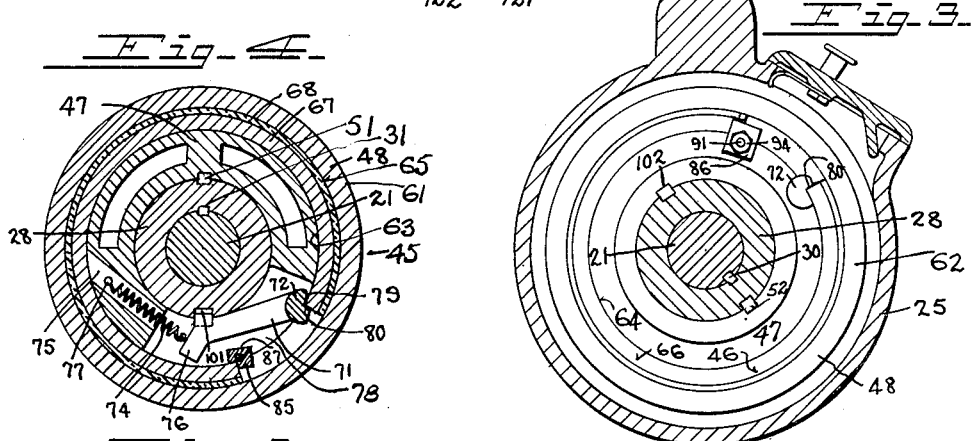
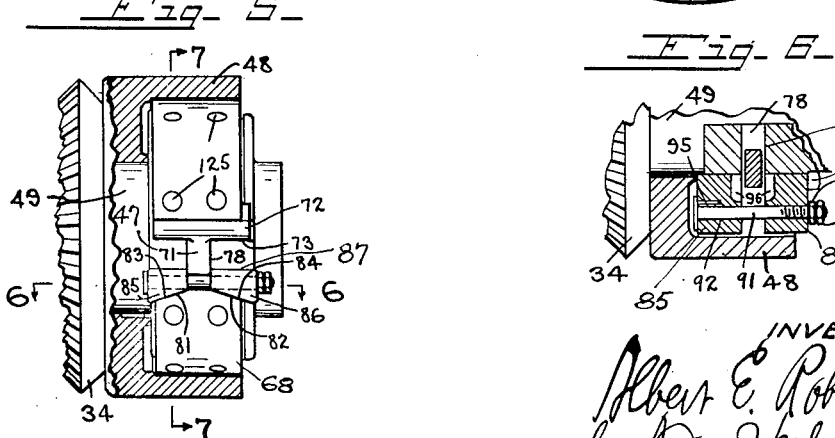
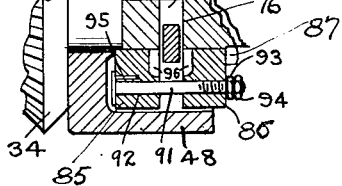
INVENTOR.  
Albert E. Robinson,  
by B. H. Herzberg,  
His Attorney.

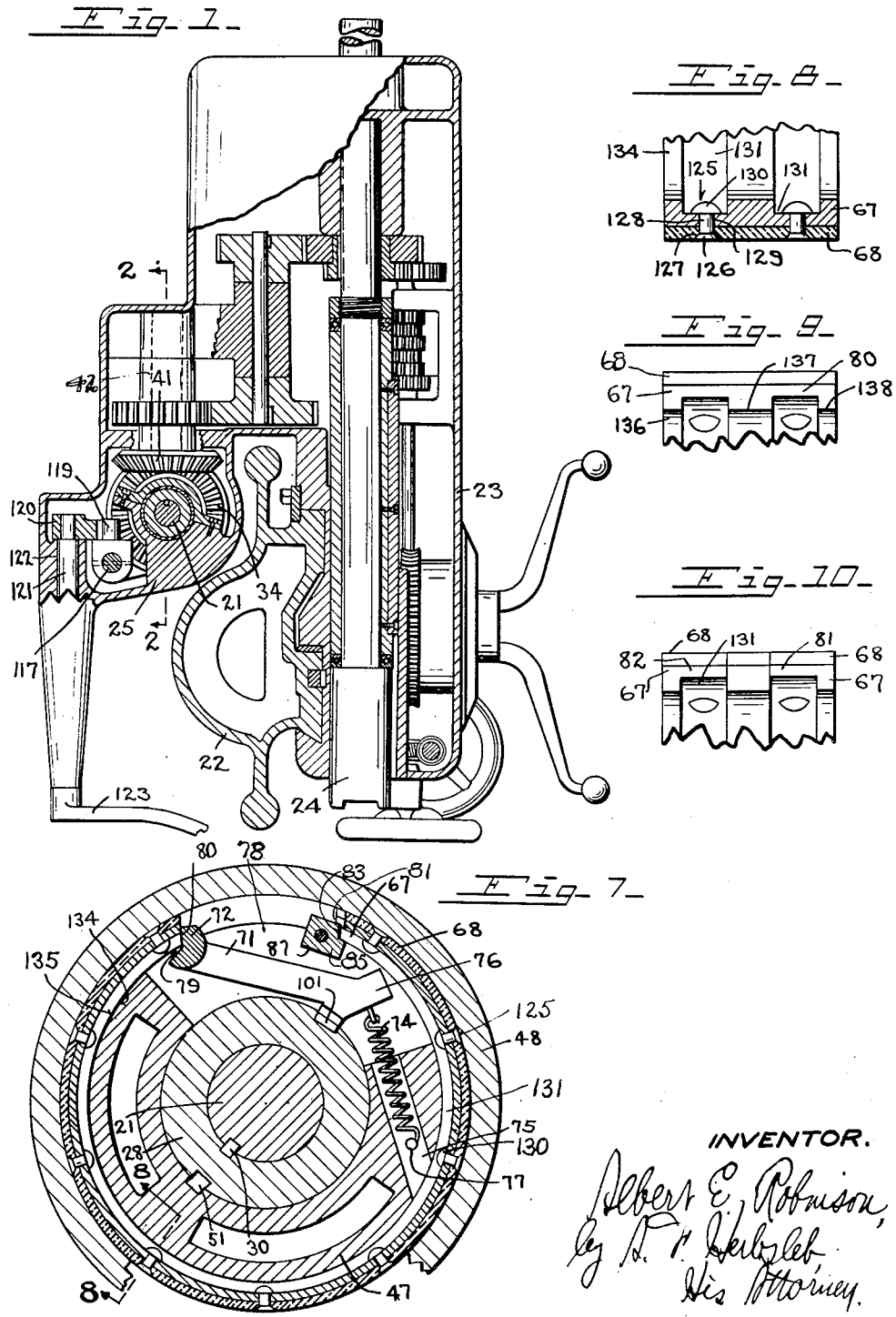

Patented Apr. 19, 1927.

1,625,397

UNITED STATES PATENT OFFICE.

ALBERT E. ROBINSON, OF CINCINNATI, OHIO, ASSIGNOR TO THE AMERICAN TOOL WORKS COMPANY, OF CINCINNATI, OHIO, A CORPORATION OF OHIO.

FRICTION-CLUTCH MECHANISM.

Application filed August 11, 1924. Serial No. 731,298.

My invention relates to friction clutch mechanism, especially to reversible friction gearing of the character of that employed in the driving means for rotating the drill spindles of drilling machines in reverse directions.

Gearing of this character is subject to great strains, and it is desirable to reverse the same instantly without jar and so that a maximum driving effect can be obtained instantly after reversing.

It is also desirable that mechanism of this character shall be compact, and that great power shall be transmitted in reverse directions within small space.

In mechanism of this character it is usual to employ a translatable slide and to supply the power by means of a shaft extending lengthwise of the direction of translation, and having two oppositely disposed bevel-gears about the shaft, which are translatable with the slide, these bevel-gears having their teeth presented toward each other and meshing with a third bevel-gear, which transmits the power from either of the pair of bevel-gears to the drill-spindle. It is usual to employ a pair of friction clutches between the shaft and the pair of bevel-gears.

An exemplification of such mechanism is to be found in Letters Patent No. 1,446,129, granted on the application of myself, February 20, 1923, for friction clutch mechanism. The present invention is primarily an improvement upon the invention shown, described and claimed in that patent.

In mechanism of this character, the power shaft usually transmits its rotations to the inner members of the clutches. The outer members of the clutches have rotative connection with the pair of bevel-gears. The bevel-gears are rotatable with the power shaft.

When the clutches are unclutched, the bevel-gears and outer members of the friction clutches are idle and non-rotative, the shaft rotating therein. When either bevel-gear of the pair is clutched to the shaft by one of the clutches, the other bevel-gear of said pair and the outer member of the other friction clutch rotate in direction opposite to the direction of rotation of the power shaft, with the result that there is a relative rotation of the idle clutch-member and the idle bevel-gear of twice the speed of the power shaft. The speeds of rotation of the power shaft in mechanisms of this character are great and practice is continually demanding increases in these rates of speed, and the load demands are also increasing.

While the friction elements of the pair of idle friction clutches, when the driven members are at rest, and of the idle friction clutch when one or the other of the pair of friction clutches is engaged, are in practice supposed to be free of contact with each other, there is and is likely to be a drag between the members of the idle friction clutch. This is especially true after the journals or bearings for the pair of bevel-gears have become worn, as they will in practice, which normally takes place rather quickly under the high speeds attained and powers required in mechanisms of this character. Such adverse condition in practice is further due to the crowding effect by the intermediate bevel-gear upon the respective gears of the oppositely disposed pair of bevel-gears.

The result is a wobbly condition of the bevel-gears of said pair, which ordinarily causes excessive wear of the friction faces of said clutches, this wear being especially excessive, due to the metal to metal contact between said friction faces in machines of this character now in general use, resulting in unevenness of said coacting friction faces, and the wearing of the same out of their proper true cylindrical shapes.

It is the object of my invention to avoid these objections, and to provide a reversible friction gearing with friction clutches so constructed that wear between the coactive friction faces shall be minimized, and whereby the gripping effect of said coactive friction faces upon each other shall be increased.

It is the object of my invention, further, to provide friction bands in a friction gearing comprising a peripheral section of a hard gripping material preponderantly other than metal. It is a further object of my invention to provide novel means for securing a peripheral layer of friction material to one of the elements of a friction clutch.

The invention will be further readily understood from the following description and claims, and from the drawings, in which latter:

Fig. 1 is an end view, partly broken away, showing my improved device in connection with so much of a radial drilling machine as is necessary to illustrate my invention.

Fig. 2 is a vertical section of the same, taken on the line 2—2 of Fig. 1.

Fig. 3 is a vertical cross-section of my improved device, taken in the plane of the line 3—3 of Fig. 2.

Fig. 4 is a vertical section of the same, taken in the plane of the line 4—4 of Fig. 2.

Fig. 5 is an edge elevation of one of the clutches, the outer clutch member being partly in axial section to expose the clutch parts, and partly broken away.

Fig. 6 is a detail of the same in section in the plane of the line 6—6 of Fig. 5.

Fig. 7 is a cross-section of my improved device, taken in the plane of the line 7—7 of Fig. 5.

Fig. 8 is a cross-section of the assembled friction band, taken in the plane of the line 8—8 of Fig. 7.

Fig. 9 is an end view of the operating end of the friction band, partly broken away; and, Fig. 10 is an end view of the abutment end of the friction band, partly broken away.

In the present exemplification of my invention, the shaft 21 is represented as the driving member, and is exemplified as the shaft which extends longitudinally of the drill-arm 22 of the drilling machine for drilling metal, along which the spindle-slide, represented at 23, which supports the drill-spindle 24, is slidable or adjustable in any ordinary or well-known manner, and by any ordinary or well-known means, not shown because well-known.

The slide may comprise a casing 25, which may be an oil-retaining casing, as shown and described, for instance, in the aforementioned Letters Patent.

A sleeve 28 is journaled in the casing, as in bearings 29. It is translatable with the slide lengthwise of the shaft 21, and has rotative connection therewith, as by providing the sleeve with a spline-key 30, which is movable in axial direction in a spline-groove 31 extending lengthwise of the shaft.

A pair of oppositely disposed bevel-gears 33, 34, are received about the sleeve, the teeth of said gears being presented toward each other. They normally rotate loosely about the sleeve, being rotatable, for instance, on bushings 35 provided with shoulders 36, which coact with shoulders 37 on the sleeve, and hold the gears in endwise separated relation.

An intermediate bevel-gear 41 meshes with the pair of bevel-gears, and is shown fixed to a shaft 42, instanced as a power transmitting shaft, to transmit the directions of rotation and the speeds thereof from the pair of bevel-gears, respectively in reverse directions, by suitable trains of gearing, to the usual tapping attachment in a drilling machine, comprising the usual drill-spindle 24. The shaft 42 is journaled in a bearing 43 in the slide.

Friction clutches 45, 46, transmit motion from the power-shaft to the driven shaft, respectively in reverse directions, or are so positioned as to be in idle relation for leaving the driven shaft non-rotative.

These friction clutches comprise, in the present exemplification, inner clutch members 47, and outer clutch members 48. The outer clutch members are fixed to the hub 49 of said bevel-gears by means of keys 50, so as to rigidly connect said friction clutch members and said bevel-gears. The inner friction clutch members are fixed to the sleeve, as by means of keys 51, 52, the said inner clutch members being held against outward movement by means of collars 53, 54, fixed to said sleeve, as by set bolts 55, 56. The inner clutch members are held endwise stationary with relation to said sleeve, as by means of said collars and shoulders 57, 58, on said sleeve, the outer clutch members being held endwise on said sleeve between said inner clutch members and the shoulders 36.

The sleeve is held in definite endwise relation to said slide.

The outer clutch members comprise annular walls 61, 62, the inner peripheries of which form cylindrical friction faces. The inner friction members comprise outer annularly arranged seats 63, 64. Annular spaces are formed between the inner friction members and the outer friction members, in which friction bands 65, 66, are received, forming intermediate friction members.

These friction bands comprise bodies 67, of resilient metal, which are self-sustaining, and peripheral sections 68, of a preponderantly non-metallic friction substance, which are self-sustaining, instanced as hard fiber sections, and which are fixed to the bodies of said bands.

The preponderantly non-metallic friction layers 68 are composed of wear-resistant friction producing material, preferably hard in substance, and act with high friction properties upon the metal surfaces of the coacting friction members, for producing instant friction contact with and grip upon said friction members, when the friction bands are moved in friction contacting directions, and are arranged to have instant release from said friction members upon reverse control movements of said respective friction bands, whereupon they act with a frictionless travel with relation to said friction members, so as to avoid wear between the parts and maintain the parts in their true relations and in true form.

The outer friction faces are in the form of cylinders. The friction bands are cylindrical in form, within substantially the entire surfaces of the cylinders, being in practice substantially complete cylinders.

The friction bands are respectively exemplified as expansible friction bands. One of the ends of each of the expansible friction bands is held by the inner member, while the other ends of said bands are pressed, as by keys 71, for expanding the friction bands respectively into engagement with the respective outer friction walls.

The keys are provided with trunnions 72 suitably pivoted in the bodies of the respective inner friction clutch members, as in seats 73, and normally retracted respectively by springs 74, located in bores 75 in the inner members, the respective ends of the respective springs being secured to arms 76 of said keys and pins 77 in said bores.

The arms 76 of the keys are arranged to reciprocate in slots 78 of the inner members, the seats 73 for the respective trunnions of the keys being at the respective sides of said slot and the arm being at the middle portion of the key to equalize the pressure exterted by the key.

The respective keys are provided with recesses 79, in which the ends of the respective friction bands are received, the end walls 80 of said recesses coacting with the end faces of said friction bands for expending the bands.

The other ends of the respective friction bands are provided with contact faces 81, 82, which slope relatively to each other crosswise of the width of the friction bands.

Contact faces 83, 84, which coact with the contact faces 81, 82, on the friction bands, are represented as located on blocks 85, 86, received in guideways 87, on the inner members at the respective sides of the slots 78 thereon.

The coacting friction faces are preferably relatively adjustable, for which purpose the contact faces 83, 84, are shown on separate blocks, the adjustments being represented as accomplished by means of bolts 91, received in bores 92 in said blocks, adjusting nuts 93 threaded to the threaded ends of said bolts determining the distance between said blocks, and jam-nuts 94 maintaining the adjusting nuts in adjusted positions.

Pins 95 prevent turning of the bolts. The adjustments of said blocks toward and from each other adjust the friction bands toward and from their keys. The blocks are provided with inner clearance spaces 96, for accommodating the arms 76 and permitting lateral movements of the blocks.

The opposite inclined coacting faces on the friction bands and blocks act as wedges, and cause lateral shifting between said coacting friction faces substantially parallel with the axis of rotation of the clutches. Such lateral shifting of the blocks takes place in the guideways 87, and serves to equalize the friction contact between said friction bands and their coacting friction faces.

Axial movement of the friction bands may be limited by annular shoulders 97, 98, on the respective inner and outer friction members.

Means are provided for expending the friction bands, exemplified as key-actuating bars 101, 102, shown in the forms of splinekeys longitudinally translatable in splinegrooves 103, 104, in the sleeve. The bars may also be received in slots 105, 106, in the inner friction clutch members.

The bars have key-operating parts thereon, shown formed as wedges 107, 108, arranged to engage the coacting faces 109, 110, formed on the keys, for actuating the latter.

Collars 111, 112, are received about the sleeve, and are shown journaled thereon and translatable lengthwise on the sleeve, and have connections respectively with the longitudinally movable bars for operating said bars and said keys.

The clutches are arranged to be placed in idle relation, and are also arranged to be selectively placed in power-transmitting relation, for conveying reverse rotations to the shaft 42. The means exemplified for operating the clutch-actuating bars are the collars 111, 112, with which forks 113, 114, coact, by being received in the annular grooves 115, 116, in said collars.

The forks are connected together by a rod 117, which slides endwise in bearings 118 in the slide. The rod is shown axially movable by a pin 119 fixed thereto, which is received between the tines of a fork 120 fixed to a rock-shaft 121, journaled in a bearing 122 of the slide, and provided with a usual external arm 123 for operating the same.

It will be understood that for most effective operation, all parts of the surface of the friction band must have intimate friction contact with all portions of the coacting friction face on the coacting friction wall, and that, for said most effective friction contact, it is desirable that the friction band retain its general cylindrical formation without strain. To that end I provide the friction band with an internal supporting face for supporting the friction band in cylindrical relation with a substantially cylindrical support during idle relation of the friction band.

It is also desirable that the friction section of the friction band, instanced as the preponderantly non-metallic friction section 68, shall move in uniform relation with the body 67 of the friction band, and be also secured firmly at all parts and throughout its cylindrical portions to said body of the friction band.

For this purpose I have provided tension members, shown as rivets 125, which have countersunk heads 126 received in countersunk recesses 127 in the outer face of said friction section of said band, and have shanks 128 received through holes 129 in said outer section and the body of the band. The other ends of said shanks are provided with heads 130, shown as upset heads of rivets, flanged over the walls of the ends of the holes 129 in the body of the friction band.

These tension members for connecting the friction section to the body of the friction band, are shown as rivets with countersunk heads in said friction section, the outer ends of said heads being formed flush with the outer surfaces of said friction section, the outer surface of said friction section when of hard fiber and said rivets being shaped to the form of a cylinder by grinding by abrasive action.

The inner periphery of the friction band is provided with an annular face 134 arranged to rest on the annular face 135 of the inner friction member. In order to permit such coaction between said faces, I provide the inner face of the friction band with recesses 131, in which the inner holding means of the tension devices for fixing the friction section to the body of the friction band are received. These inner holding means, shown as the inner rivet heads, are located wholly within said recesses, so that said friction band may rest with its inner peripheral face 134 upon the outer peripheral face 135 of the inner friction member.

I have found it desirable and a great saving in manufacture, to form these recesses as annular grooves in the inner face of the friction band, forming ridges 136, 137, 138, having an inner cylindrical face on which said friction band finds seat on the coacting resting face 135 of the inner clutch member.

I have also found it desirable to cause the end abutments between the blocks 85, 86, and of the wall 80 of the key with the ends of the friction band to be limited in their coaction, so as to make contact only with the inner or metal member of said friction band, and thus relieve the ends of the friction section of said friction band from said end abutting contacts, whereby end crushing of the ends of said outer friction section is avoided.

It is obvious that changes may be made in my improved device without departing from the spirit of my invention as expressed in the appended claims.

Having thus fully described my invention, what I claim as new, and desire to secure by Letters Patent, is:

1. A friction clutch comprising an inner wall and an outer wall having an annular space therebetween, a friction-band received in said space, said friction-band comprising a resilient body and a preponderantly non-metallic friction-layer, the inner face of said resilient body provided with an annular groove forming annular resting faces at the respective sides of said groove for said resilient body on said inner wall, and tension-members fixing said friction-layer to said resilient body, said tension-members comprising enlargements located wholly within said annular groove and spaced from each other in said annular groove.

2. A friction clutch comprising an inner wall and an outer wall having an annular space therebetween, a friction band received in said space and comprising a body and a friction-section, the inner face of said body provided with annular grooves forming annular resting faces at the respective sides of said annular grooves for supporting said body on said inner wall, and tension members connecting said friction-section with said body, said tension members comprising enlargements at one of their ends countersunk in said friction-section and enlargements at their other ends located in said annular grooves, said annular grooves extended lengthwise of said friction-band between said annular resting faces and between said last-named enlargements.

3. A friction clutch comprising an inner annular wall and an outer annular wall having an annular space therebetween, an annular friction-band received in said space and comprising a resilient metallic body and a preponderantly non-metallic friction layer, the inner face of said body provided with continuous annular grooves and annular resting ridges at the respective sides of said grooves arranged to rest on said inner annular wall for supporting said annular friction-band, said annular grooves provided with annular bottom walls, and rivets connecting said preponderantly non-metallic friction layer and said resilient metallic body of said annular friction-band passing through said layer and said body and provided with fastening enlargements within said annular grooves, and said enlargements formed with shoulders received upon said annular bottom walls of said annular grooves.

In testimony whereof, I have hereunto signed my name.

ALBERT E. ROBINSON.